(12) United States Patent
Nolan et al.

(10) Patent No.: US 9,525,704 B2
(45) Date of Patent: Dec. 20, 2016

(54) SYSTEMS, DEVICES, AND METHODS FOR TRAFFIC MANAGEMENT

(75) Inventors: John E. Nolan, Sacramento, CA (US); Jim A. Baumgartner, Roseville, CA (US); Robert L. Faulk, Jr., Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 182 days.

(21) Appl. No.: 14/124,299

(22) PCT Filed: Aug. 15, 2011

(86) PCT No.: PCT/US2011/047744
§ 371 (c)(1),
(2), (4) Date: Dec. 6, 2013

(87) PCT Pub. No.: WO2013/025195
PCT Pub. Date: Feb. 21, 2013

(65) Prior Publication Data
US 2014/0157357 A1    Jun. 5, 2014

(51) Int. Cl.
*G06F 17/00* (2006.01)
*H04L 29/06* (2006.01)
*H04L 12/813* (2013.01)
*G06F 9/455* (2006.01)

(52) U.S. Cl.
CPC ........... *H04L 63/20* (2013.01); *G06F 9/45558* (2013.01); *H04L 47/20* (2013.01); *H04L 63/0236* (2013.01)

(58) Field of Classification Search
CPC .. H04L 63/0227; H04L 63/0263; H04L 63/20; H04L 45/00; H04L 45/30; H04L 67/2814
See application file for complete search history.

(56) References Cited

U.S. PATENT DOCUMENTS

| | | | |
|---|---|---|---|
| 7,448,079 B2 | 11/2008 | Tremain | |
| 2004/0218535 A1 | 11/2004 | Liong et al. | |
| 2004/0221051 A1 | 11/2004 | Liong et al. | |
| 2005/0047412 A1* | 3/2005 | Hares | H04L 41/0893 370/392 |
| 2007/0214505 A1 | 9/2007 | Stavrou et al. | |

(Continued)

FOREIGN PATENT DOCUMENTS

| | | |
|---|---|---|
| EP | 2043320 A1 | 4/2009 |
| EP | 2355570 A2 | 8/2011 |

OTHER PUBLICATIONS

International Search Report and Written Opinion, Feb. 9, 2012, PCT Application No. PCT/US2011/047744.

*Primary Examiner* — Amir Mehrmanesh
*Assistant Examiner* — Quy Pham
(74) *Attorney, Agent, or Firm* — Brooks, Cameron & Huebsch, PLLC

(57) ABSTRACT

Systems, devices, and methods for traffic management are provided. An example of a method for traffic management includes receiving a number of policies for data traffic redirection 230 in a data network 100 and authorizing a subset of the number of policies based upon matching a plurality of authorization rules 350 saved in the data network 100, for example, in a management tool 120 and/or a network device 123.

15 Claims, 5 Drawing Sheets

230 — TRAFFIC REDIRECTION TABLE

| REDIRECT POLICY NUMBER 232 | ADMINISTRATOR ID 235 | TRAFFIC 237 | | DESTINATION 243 | | |
|---|---|---|---|---|---|---|
| | | TRAFFIC SELECTOR TYPE 239 | TRAFFIC SELECTOR VALUE 241 | APPLICATION ID 245 | DESTINATION TYPE 247 | DESTINATION INFO 249 |
| 1 | JIM | IP-ACL | SOURCE IP =15.28.4.* | 1034 | PORT | D1 |
| 2 | JOHN | IP-ACL | SOURCE IP =15.29.*.* && DEST IP = 17.2.*.* | 1065 | NEXT-HOP | 17.2.1.1 |
| 3 | JIM | MAC-ACL | SOURCE MAC=080009-123456 | 0007 | PORT | D1 |
| 4 | BOB | IP-ACL | DESTINATION IP =18.65.1.* | 2412 | NEXT-HOP | 18.65.1.1 |

(56) References Cited

U.S. PATENT DOCUMENTS

| | | | |
|---|---|---|---|
| 2008/0080508 A1* | 4/2008 | Das | H04L 12/4633 370/392 |
| 2008/0181208 A1* | 7/2008 | Maes | H04L 45/00 370/389 |
| 2008/0205377 A1 | 8/2008 | Chao et al. | |
| 2009/0037162 A1 | 2/2009 | Gaither et al. | |
| 2009/0249438 A1 | 10/2009 | Litvin et al. | |
| 2009/0328225 A1 | 12/2009 | Chambers et al. | |
| 2010/0017519 A1 | 1/2010 | Han et al. | |
| 2010/0027420 A1 | 2/2010 | Smith | |
| 2010/0146076 A1* | 6/2010 | Adriazola | H04L 65/4084 709/219 |
| 2010/0242105 A1 | 9/2010 | Harris et al. | |

\* cited by examiner

TRAFFIC REDIRECTION TABLE 230

| REDIRECT POLICY NUMBER 232 | ADMINISTRATOR ID 235 | TRAFFIC 237 | | APPLICATION ID 245 | DESTINATION 243 | |
|---|---|---|---|---|---|---|
| | | TRAFFIC SELECTOR TYPE 239 | TRAFFIC SELECTOR VALUE 241 | | DESTINATION TYPE 247 | DESTINATION INFO 249 |
| 1 | JIM | IP-ACL | SOURCE IP = 15.28.4.* | 1034 | PORT | D1 |
| 2 | JOHN | IP-ACL | SOURCE IP = 15.29.*.* && DEST IP = 17.2.*.* | 1065 | NEXT-HOP | 17.2.1.1 |
| 3 | JIM | MAC-ACL | SOURCE MAC=080009-123456 | 0007 | PORT | D1 |
| 4 | BOB | IP-ACL | DESTINATION IP =18.65.1.* | 2412 | NEXT-HOP | 18.65.1.1 |

Fig. 2

REDIRECTION AUTHORIZATION TABLE

| AUTHORIZE POLICY NUMBER 352 | ADMINISTRATOR ID 355 | TRAFFIC 358 | | APPLICATION ID 368 | DESTINATION 365 | | ACTION 375 |
| --- | --- | --- | --- | --- | --- | --- | --- |
| | | TRAFFIC SELECTOR TYPE 360 | TRAFFIC SELECTOR VALUE 362 | | DESTINATION TYPE 370 | DESTINATION INFO 372 | |
| 1 | JIM | * | * | * | PORT | D1 | PERMIT |
| 2 | * | IP-ACL | DESTINATION IP=17.2.*.* | 1* | NEXT-HOP | 17.2.1.1 | PERMIT |
| 3 | * | IP-ACL | DESTINATION IP=17.2.*.* | 1* | PORT | B* | PERMIT |
| 4 | * | IP-ACL | DESTINATION IP=18.65.*.* | 2* | NEXT-HOP | 18.65.*.* | PERMIT |
| 5 | * | IP-ACL | DESTINATION IP=18.65.*.* | 2* | PORT | C* | PERMIT |
| 6 | * | * | * | * | * | * | DENY |

Fig. 3

SYSTEMS, DEVICES, AND METHODS FOR TRAFFIC MANAGEMENT

CROSS-REFERENCE TO RELATED APPLICATION

This application is a U.S. National Stage Application of and claims priority to International Patent Application No. PCT/US2011/047744, filed on Aug. 15, 2011, and entitled "SYSTEMS, DEVICES, AND METHODS FOR TRAFFIC MANAGEMENT".

BACKGROUND

Demand for higher density computer resources has increased. Unlike those computer systems that include one or more processors functioning under the control of a single operating system, a multiple host (multi-host) distributed computer system typically includes multiple hosts, each including one or more processors, each running under the control of a separate operating system.

In virtualized environments where workloads are moving, traffic (e.g., data streams, workload, network information, etc.) can be difficult to manage and track. In some systems, an administrator can redirect traffic directed to or from a server using Policy Based Routing or Policy Based Forwarding. However, moving a workload, for instance, from one subnetwork (subnet), server, or application to another can disrupt applicability of saved parameters and/or be susceptible to misdirection of the workload.

BRIEF DESCRIPTION OF THE DRAWINGS

FIG. 2 illustrates an example traffic redirection table for data traffic management according to the present disclosure.

FIG. 3 illustrates an example redirection authorization table for data traffic management according to the present disclosure.

DETAILED DESCRIPTION

Figure 1:
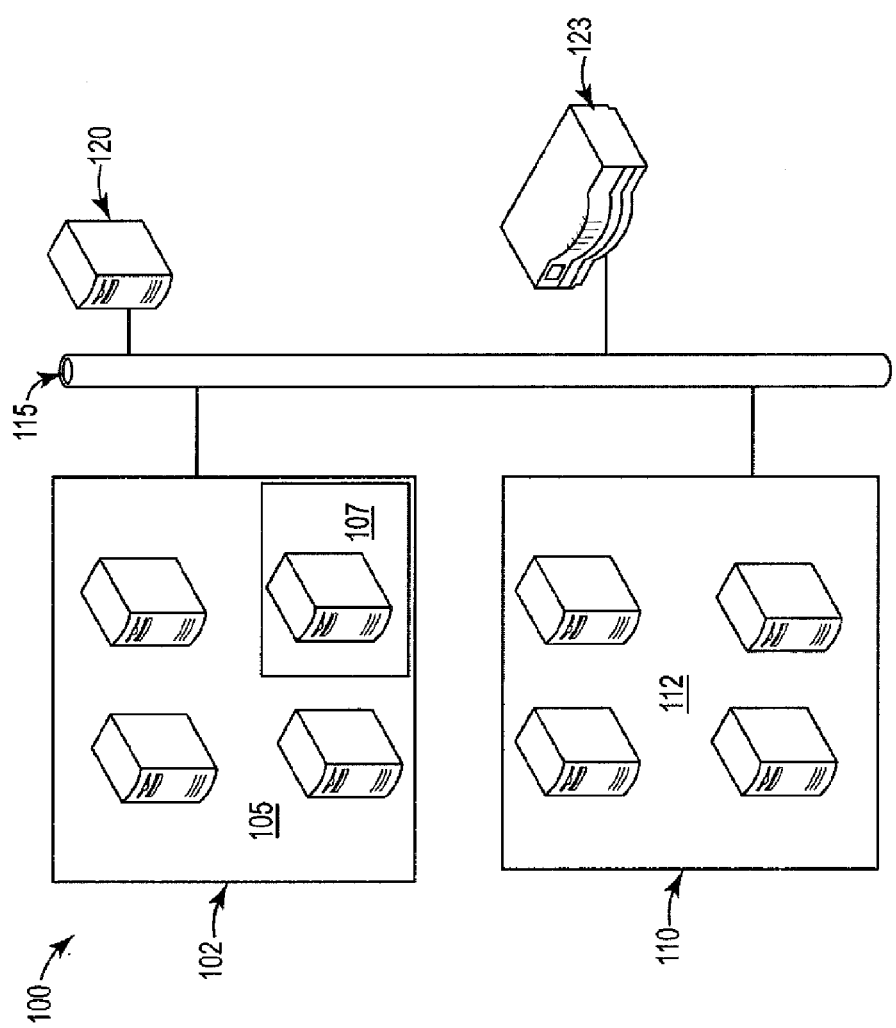
FIG. 1 illustrates a block diagram of an example of a system for data traffic management according to the present disclosure.

Servers may be identified by a Media Access Control (MAC) address, for instance. Network switches may learn the location of a server when the network switch receives a packet. When an administrator relocates a physical or virtual server from one location to another in a plurality of such servers, network switches may automatically learn the location if the movement is within a switched layer 2 network, for instance. However, if the server has been relocated to a different subnet, the network may not automatically forward its traffic, since the server would have an Internet Protocol (IP) address, for instance, that does not identify the different subnet. Thus, a router could attempt to route the server's traffic to its original subnet. In other environments, Policy Based Routing may be used to direct traffic to a given server. However, when the server moves, the policy route may need to be reconfigured.

Furthermore, there may be no authorization to ensure that a given administrator is permitted to configure or reconfigure the policy redirecting the specified traffic to particular applications on a specified server. Even if the given administrator is authorized (e.g., is permitted) to configure or reconfigure policy routing on a network switch, there may be no restrictions on how the given administrator configures or reconfigures the policy routing. As such, if the given administrator intentionally or unintentionally provides inappropriate policy routing instructions, the traffic may be directed to unauthorized locations in the plurality of servers and subnets.

Customers (e.g., clients) may be concerned that their data will possibly be redirected to unintended and/or unauthorized locations in a virtual datacenter. Examples of the present disclosure include methods, devices, and systems for data traffic management that may mitigate such concerns, where data traffic management encompasses storage of data files and active movement of the data files, in addition to related actions. An example of a method for data traffic management includes receiving a number of policies for data traffic redirection in a data network and authorizing a subset of the number of policies based upon matching a plurality of authorization rules, as described herein, saved in a management tool of the data network. Hence, as described in detail herein, the present disclosure may mitigate customers' concerns by providing an independently-configured redirection security policy to confirm that administrators are authorized to redirect appropriate data traffic to appropriate locations.

In the detailed description of the present disclosure, reference is made to the accompanying drawings that form a part hereof, and in which is shown by way of illustration how examples of how the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. Further, where appropriate, as used herein, "for example" should be understood as an abbreviation for "by way of example and not by way of limitation".

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

FIG. 1 illustrates a block diagram of an example of a system for data traffic management according to the present disclosure. The example of the system for data traffic management 100 can comprise a first specified server or a first specified virtual machine 102 of a plurality of servers or virtual machines. Each individual instance of a virtual machine can be considered a virtual server or a virtual machine guest. The first specified server or the first specified virtual machine 102 can include a plurality of applications (e.g., for data storage, among other uses). For example, the first specified server or the first specified virtual machine 102 can include three applications 105 for a first customer and one application 107 for a second customer, as illustrated in FIG. 1. The icons shown in FIG. 1 are intended to represent elements of the system for data traffic management, which in various examples can each be separate or combined, and do not limit components usable in the system. For example, the first specified virtual machine 102 could be shown as a server icon that contains other server icons and/or compact disc icons, among others, to represent applications, rather than a square that contains servers.

The system for data traffic management 100 can, for example, also comprise a second specified server or a second specified virtual machine 110 of the plurality of servers or virtual machines. The second specified server or the second specified virtual machine 110 can also include a plurality of applications 112. For example, the second specified server or the second specified virtual machine 110 can include no applications for the first customer and four applications 112 for the second customer, as illustrated in FIG. 1.

In some situations, the second specified server or the second specified virtual machine 110, with associated applications 112, can be located on a different subnet of the system relative to the first specified server or the first specified virtual machine 102, with associated applications 105, 107. Regardless of whether the first specified server or the first specified virtual machine 102 is located on the same or a different subnet relative to the second specified server or the second specified virtual machine 110, the various servers and virtual machines of the system can have a link for data traffic transmission (i.e., be operatively coupled) through a communication interconnect 115, as illustrated in FIG. 1.

The example system for data traffic management 100 illustrated in FIG. 1 comprises a management tool 120. The management tool 120 can be operatively coupled through the communication interconnect 115 to a network device 123. As illustrated in FIG. 1, the management tool 120 and the network device 123 each can be operatively coupled through the communication interconnect 115 to the first specified server or the first specified virtual machine 102 and the second specified server or the second specified virtual machine 110 whether the servers or virtual machines are located on the same or a different subnet relative to each other.

The network device 123 comprises memory storing characteristics of the various servers and virtual machines of the system in addition to the particular customer or customers (e.g., clients, separate management entities, etc.) associated with each particular application located thereon. The network device 123 comprises a number of switches that can be configured by the management tool 120.

The present disclosure provides a dynamic switch configuration to manage moving traffic (e.g., data streams, workloads, network information, etc.). A virtual machine manager or centralized virtual datacenter management application (e.g., the management tool 120) can configure the switches to which traffic is connected. Security policies can be applied to a requested configuration or reconfiguration to confirm that the virtual machine manager is permitted (e.g., is authorized) to direct or redirect the specified traffic to the specified physical server or virtual machine.

In a unified environment, when a virtual machine guest is being brought up, the virtual machine guest may be assigned processing resources, memory, and disk space. Some vendors may extend this to include network bandwidth. The present disclosure extends this reservation concept to confirm that certain types of data packets are directed to specified applications on specified servers. When this workload moves, the management tool 120 can migrate an associated traffic stream and all of the properties associated with this workload with the guest virtual machine by reconfiguring switches in the network device 123.

Before a redirect policy is activated, an authorization check can be performed to confirm whether the redirect policy is permissible. This authorization check can provide an additional level of security, which may be particularly useful when multiple separate management entities are involved and the data traffic contains confidential material. Accordingly, the management tool 120 and the network device 123 (e.g., including the associated switches) can have a set of authentication and authorization features. As such, more than a simple "guest/root" administrator privilege level is used within the switches.

Hence, an example of the present disclosure includes a data traffic management system 100 comprising a communication interconnect 115, a network device 123 configured to receive a number of policies for data traffic redirection coupled to the communication interconnect 115, and a management tool 120 configured to authorize a subset of the number of policies for data traffic redirection by a number of switches conditioned on a match with a plurality of saved authorization rules. As an example, a traffic management system can comprise a communication interconnect 115, a management tool 120 configured to authorize (e.g., permit or set) a subset of the number of policies for data traffic redirection, and a number of switches (e.g., of network device 123) configured to receive the number of policies and match the number of policies with a plurality of saved authorization rules.

In various examples, the number of switches can be configured to direct the data traffic to a particular application of a specified server or a specified virtual machine of a plurality of servers or virtual machines. In various examples, the management tool 120 can be configured to authorize the number of switches to redirect the data traffic to the particular application of the specified server or the specified virtual machine conditioned on a match of a plurality of redirection rules for a particular data traffic redirection with the plurality of saved authorization rules, as described herein.

Examples of the present invention may include data traffic management devices, systems, and methods, including executable instructions and/or logic. Processing resources can include one or more processors able to access data stored in memory (e.g., as illustrated in the tables presented herein, among other data) to execute the comparisons, actions, functions, etc., described herein. As used herein, "logic" is an alternative or additional processing resource to execute the comparisons, actions, functions, etc., described herein that includes hardware (e.g., various forms of transistor logic, application specific integrated circuits (ASICs), etc.), as opposed to computer executable instructions (e.g., software, firmware, etc.) stored in memory and executable by a processor.

In a computing device network, as used herein, a number of network devices can be networked together in a Local Area Network (LAN) and/or a Wide Area Network (WAN), a personal area network (PAN), and the Internet, among other networks, via routers, hubs, switches, and the like. As used herein, a network device (e.g., a device having processing and memory resources and/or logic that is connected to a network) can include a number of switches, routers, hubs, bridges, etc. Although terms such as "switch" are used herein, examples may be implemented with other appropriate network devices.

FIG. 2 illustrates an example traffic redirection table for data traffic management according to the present disclosure.

In a network environment, network devices may forward traffic to server-based applications based on a destination IP address and a Transmission Control Protocol (TCP) port number of each packet. Certain network-centric applications (e.g., Intrusion Prevention Systems (IPS), monitoring applications, troubleshooting applications, WAN Accelerators, or Traffic Servers) may operate in "promiscuous mode" and process packets addressed to all IP addresses. These network centric applications may run on servers physically connected inline to the traffic of interest, or rely on a network device to redirect selected traffic to them, even though the traffic is not to their address.

In contrast, a Traffic Redirection Table 230, as illustrated in FIG. 2, shows a traffic redirection schema that controls how a network device can redirect traffic. The Traffic Redirection Table 230 includes columns for a Redirect Policy Number 232 for each redirection rule that specifies a particular manager or management application, identified by an Administrator ID 235, responsible for adding a policy to redirect specified network Traffic 237 to a specified Destination 243.

Traffic Selector Type 239 and Destination Info 249 fields provide information about the selected traffic and about the destination to which the selected traffic will be redirected. Many types of traffic selectors exist, such as those used for Policy Based Routing (PBR) or Access Control Lists (ACLS), among others. A Traffic Selector Type 239 of IP-ACL indicates the value should be interpreted as an Access Control List, with optional fields to match various parts of the packet such as IP address, TCP port numbers, or other fields. Other types of traffic selectors based on packet content or packet context are usable. A Traffic Selector Value 241 provides information identifying a designated source and/or destination for the data traffic corresponding to each redirect policy.

Application ID 245 provides information concerning the Destination 243 identifying an application to which the traffic is to be redirected. A Destination Type 247 provides information about the type of the Destination Info 249. For example, a Destination Type 247 of PORT can cause the packet to be directed out a specific port of the network device, whereas a Destination Type 247 of NEXT-HOP can cause the network device to forward the packet to the given IP next hop. Other destination types such as tunnels or DMA instructions are also usable. Each row of the Traffic Redirection Table 230 contains a policy rule (e.g., 1, 2, 3, 4, etc.) that specifies how network traffic is to be redirected to the specified destination.

Each redirection rule of a policy may contain multiple redirection rules. The reader will appreciate that traffic redirection tables could contain more or less information than is present in FIG. 2. Examples are not limited to the specific tables illustrated herein. For example, a particular redirection rule of a policy may have an ordered presentation of redirection rules (e.g., subrules). Each of the subrules can be compared with appropriate authorization rules, as described herein, to determine whether the policy can be enabled by inclusion in the Traffic Redirection Table 230.

FIG. 3 illustrates an example redirection authorization table for data traffic management according to the present disclosure. Before a policy can be added to a Traffic Redirection Table, such as that illustrated in FIG. 2, the policy is authorized (e.g., permitted or approved) by, for example, a data traffic management device using a Redirection Authorization Table 350, as illustrated in FIG. 3.

The Redirection Authorization Table 350 is an example of an administrative security policy to authorize specifically how individual network administrators or datacenter management entities are permitted to redirect traffic. When a virtual machine is moved and the administrator or datacenter management entity attempts to configure traffic redirection, an authorization step is performed. Each such authorization can be assigned an Authorization Policy Number 352 (e.g., 1, 2, 3, 4, 5, 6, etc.), as shown in the first column of the Redirection Authorization Table 350.

Authorization rules for each Authorization Policy Number 352 comprise a particular manager or management application (e.g., an administrator or datacenter management entity), identified by an Administrator ID 355, permitted to perform the traffic redirection, information to identify the network Traffic 358 that the particular manager or management application is permitted to redirect, and information to identify a permitted Destination 365 to which the Traffic 358 can be redirected, which can include information to identify a number of applications.

The Redirection Authorization Table 350 can include additional authorization rules to further define permissibility. For example, similar to the Traffic Redirection Table 230 shown in FIG. 2, the Redirection Authorization Table 350 can comprise a Traffic Selector Type 360 and Destination Info 372 fields to provide information about the selected traffic and about the destination to which the selected traffic is permitted to be redirected. A Traffic Selector Value 362 can provide information identifying a permitted designated destination(s) for the data traffic corresponding to each authorize policy.

Application ID 368 can provide further information concerning the Destination 365 identifying an application to which the traffic is permitted to be redirected. A Destination Type 370 can provide information about the permitted type of the Destination Info 372. For example, a Destination Type 370 of PORT can permit the packet to be directed out a specific port of the network device, whereas a Destination Type 370 of NEXT-HOP can permit the network device to forward the packet to the given IP next hop.

As shown in the Action 375 column of the Redirection Authorization Table 350, the output of the authorization step is to Permit or Deny addition of each specified Authorize Policy Number 352 to a Traffic Redirection Table 230, an example of which is illustrated in FIG. 2.

For example, a datacenter may handle data traffic for Company X and Company Y, the two companies possibly being archrival competitors where sharing data may be problematic for one or both. When a Company X application is moved from one server to another in the data center, a network administrator or an automated datacenter virtualization management system can reconfigure network traffic redirection policies to direct the traffic to the new server. Care should be taken, however, that Company X network traffic is not misdirected to a Company Y application or a Company Y-owned server.

A Redirection Authorization Table provides a layer of security to confirm that Company X network traffic is directed to a Company X application running on a Company X server. In the examples illustrated in FIGS. 2 and 3, "*" (i.e., an asterisk) denotes a wildcard that will match any values. As such, a general indicator of Company X traffic being on a particular subnet is using 17.2.*.* and a general indicator of Company Y being on a different subnet is using 18.65.*.*, where particular servers, applications, etc., would be denoted by particular value(s) instead of the asterisk(s).

In the examples illustrated in the Traffic Redirection Table 230 and the Redirection Authorization Table 350, Company X applications have an Application ID 245, 368 in a range of 1000-1999, and Company Y applications have an Application ID 245, 368 in a range of 2000-2999, for example. Company X servers are connected to ports B1-B24, and Company Y servers are connected to ports C1-C24, for example. The Traffic 237, 358 and Destination 243, 365 fields are generally interpreted in the same way in the Traffic Redirection Table 230 and the Redirection Authorization Table 350. However, all fields of the Redirection Authorization Table 350 may contain only a wildcard or any designator may include one or more wildcards, with the exception of the Action 375 field.

For example, an Application ID 368 in the Redirection Authorization Table 350 can be a single asterisk, which would indicate that data traffic can be permissibly directed to an application related to any customer if other authorization rules are satisfied. Alternatively, if an Application ID 368 is denoted by 1* the data traffic can be permissibly directed to applications 1000-1999 of Customer X and if an Application ID 368 is denoted by 2* the data traffic can be permissibly directed to applications 2000-2999 of Customer Y, as long as other authorization rules are satisfied for each.

When an administrator proposes to add a policy to a Traffic Redirection Table, for example, as illustrated in FIG. 2, each redirection rule of the redirect policy is evaluated against each of the authorize policies in a Redirection Authorization Table, for example, as illustrated in FIG. 3. That is, the first redirection rule of the redirect policy can be compared with each authorization rule of each Authorization Policy Number 352 of the Redirection Authorization Table 350, and the Action 375 can be identified for the first matching Authorization Policy Number 352 of the Redirection Authorization Table 350.

If a decision is to deny based on comparison of the first redirection rule of the proposed redirect policy, an Action 375 can be taken to Deny the entire redirect policy. If the decision on the first redirection rule is to permit, the second redirection rule of the redirect policy can be compared with each authorization rule of each Authorization Policy Number 352 of the Redirection Authorization Table 350, and so on until each redirection rule of the redirect policy has been analyzed. If the resulting decisions are to permit all redirection rules of the proposed redirect policy, an Action 375 can be taken to Permit the entire policy to be added into the Traffic Redirection Table, as illustrated in FIG. 2. If the resulting decisions are to deny any of the redirection rules of the proposed redirect policy, an Action 375 can be taken to Deny the entire policy being added into the Traffic Redirection Table.

For example, as shown in Authorize Policy Number 1 of the Redirection Authorization Table 350 illustrated in FIG. 3, the Administrator ID 355 indicates that Jim, the authorized technician, is permitted (e.g., authorized) to direct any type of Traffic 358 to a Destination 365 having any Application ID 368 connected to port D1 (as specified in the Destination Type 370 and Destination Info 372 fields).

As shown in Authorize Policy Number 5, an attempt by any technician to send Company Y traffic to a Company Y server can be permitted. An Action 375 can be taken to Permit such a proposed redirect policy because a destination such as IP=18.65.2.2 matches Destination IP=18.65.*.* as a Traffic Selector Value 362, an application such as ID 2234 matches 2* as an Application ID 368, and a port such as port C2 matches C* as Destination Info 372. Accordingly, an Action 375 can be taken to Permit that policy to be added to the Traffic Redirection Table.

In contrast, as shown in Authorize Policy Numbers 1-5, an attempt by Bob, who matches the asterisk in Authorize Policy Numbers 2-6, to add a proposed policy containing a redirection rule to redirect traffic with a destination of 17.2.1.1 to port C4 would not match any of the other authorization rules in Authorize Policy Numbers 2-6. However, this proposed redirect policy would match Authorize Policy Number 6, which has all fields populated by wildcard asterisks and, thus, an Action 375 can be taken to Deny the proposed redirect policy from being added to the Traffic Redirection Table. That is, in various examples, an Authorize Policy can be utilized in which matching at least one of the authorization rules can result in an Action to Deny the proposed redirect policy from being added to the Traffic Redirection Table. In some examples, for instance as shown in FIG. 3, an Authorize Policy having an Action to Permit (e.g., Authorize Policy Numbers 1-5) can override an Authorize Policy having an Action to Deny (e.g., Authorize Policy Numbers 6). As the example in the Redirection Authorization Table 350 is formatted, any attempt by Bob to propose a redirect policy that would send Company X traffic to Company Y, or vice versa, can result in an Action 275 being taken to Deny the proposed redirect policy from being added to the Traffic Redirection Table.

Application of authorization rules, as utilized in the present disclosure, is not limited to the example just presented with regard to FIG. 3. Matching or not matching an authorization rule in an authorize policy can have a number of consequences. For example, matching a particular redirection rule with a particular authorization rule may result in a "pass" determination for that particular redirection rule or a "fail" determination for that particular redirection rule. Alternatively or in addition, not matching a particular redirection rule with a particular authorization rule may result in a "pass" determination for that particular redirection rule or a "fail" determination for that particular redirection rule.

Implementation of such in authorization rules can, for example, include: First Match—compare each redirection rule of a proposed redirect policy with each authorize policy sequentially and note the pass/fail determination of the first matching entry, whereby if any redirection rule fails, all of the redirection rules of the proposed redirect policy will be denied from being added to the Traffic Redirection Table; Match Any Deny—compare each redirection rule of a proposed redirect policy with all entries in the Redirection Authorization Table and if a particular redirection rule matches any authorization rule with a fail determination, all of the redirection rules of the proposed redirect policy will be denied from being added to the Traffic Redirection Table; and/or Match Any Permit—compare each redirection rule of a proposed redirect policy with all entries in the Redirection Authorization Table and if a particular redirection rule matches at least one authorization rule with a pass determination, all of the redirection rules of the proposed redirect policy will be permitted to be added to the Traffic Redirection Table; among other possible implementations of the authorization rules. As an outcome, for example, the number of traffic redirection tables can each comprise received policies that match a first plurality of authorization rules and/or do not include received policies that match a second plurality of authorization rules.

Each authorize policy may contain multiple authorization rules and each authorization rule may contain multiple designations for administrators, traffic, destinations, etc. The reader will appreciate that redirection authorization tables could contain more or less information than is present in FIG. 3. Examples are not limited to the specific tables illustrated herein.

As such, as described in the present disclosure, the combination of the Redirection Authorization Table with the Traffic Redirection Table enables some protection of a particular customer's network data from being accidentally or intentionally redirected to another customer. Accordingly, an example of a data traffic management device can comprise a data network interface, a subsystem configured to receive a number of policies for data traffic redirection (e.g., proposed redirect policies), where the subsystem is coupled to the data network interface, and a processing resource (e.g., a number of processors and/or logic) of a management tool is configured to authorize a subset of the number of policies based upon a match of a plurality of authorization rules saved in the management tool, where the management tool is coupled to the subsystem and the data network interface.

In various examples of the present disclosure, the processing resource can authorize the subset by comparison of a plurality of redirection rules of each of the number of received policies (e.g., proposed redirect policies) to the plurality of authorization rules to determine whether the plurality of redirection rules matches the plurality of authorization rules. A number of traffic redirection tables, in various configurations, can be utilized that each save a number of redirection policies that each have a plurality of redirection rules selected from a group that comprises: identification of a virtual machine manager or a virtual management application from which a particular policy is received; a description of the data traffic to be redirected; and a description of a destination of the data traffic to be redirected.

In various configurations, the management tool can comprise a number of redirection authorization tables that each save a plurality of authorization rules, for data traffic redirection policies, selected from a group that comprises: identification of a virtual machine manager or a virtual management application from which a number of particular policy redirection rules are permitted; a description of permitted data traffic to be redirected; and a description of a number of permitted destinations for redirection of the data traffic. In some configurations, other components of the data traffic management device (e.g., a number of network devices 123, as illustrated in FIG. 1), can each save and use a number of redirection authorization tables that can be configured by a number of management tools. Accordingly, the number of traffic redirection tables can each store (e.g., enable) received policies (e.g., corresponding to the proposed redirect policies) that match (e.g., have redirection rules that match) the plurality of authorization rules and can not store (e.g., enable) received policies that do not match the plurality of authorization rules.

Figure 4:
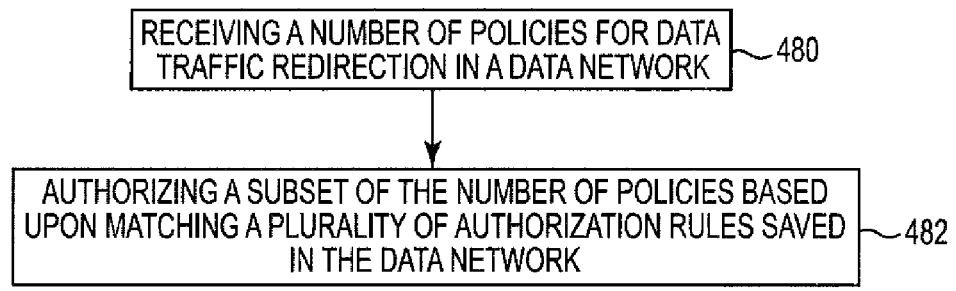
FIG. 4 is a block diagram illustrating an example of a method for data traffic management according to the present disclosure.

FIG. 4 is a block diagram illustrating an example of a method for data traffic management according to the present disclosure. Unless explicitly stated, the method examples described herein are not constrained to a particular order or sequence. Additionally, some of the described method examples, or elements thereof, can occur or be performed at the same, or substantially the same, point in time.

As described in the present disclosure, data traffic management comprises receiving a number of policies for data traffic redirection in a data network, as shown in block 480 of FIG. 4. Authorizing a subset of the number of policies is based upon matching a plurality of authorization rules saved in the data network, as shown in block 482. In various examples, the plurality of authorization rules can be saved in a management tool and/or a network device of the data network.

The number of policies (e.g., proposed redirect policies) can, in various examples, be received from a virtual machine manager or a virtual management application and whether the virtual machine manager or the virtual management application is authorized to redirect particular data traffic can be determined. In some examples, the number of policies can be received by the management tool and/or the network device of the data network. Receiving the number of policies for data traffic redirection can, in various examples, comprise receiving directions for reconfiguring a number of switches that direct data traffic to a specified server or a specified virtual machine of a plurality of servers or virtual machines.

Authorizing the subset of the number of policies can comprise permitting enablement of the subset based upon matching the plurality of authorization rules and denying enablement of policies that do not match the plurality of authorization rules. Such enablement can be performed by inclusion of permitted policies into a number of traffic redirection tables, as described herein.

Authorizing the subset of the number of policies can comprise comparing a plurality of redirection rules of the number of policies to the plurality of authorization rules to perform the matching, where the redirection rules and authorization rules can be selected from a group that comprises: identification of a virtual machine manager or a virtual management application from which a particular policy is received; a description of the data traffic to be redirected; and a description of a destination of the data traffic to be redirected. Accordingly, data traffic can be protected from being redirected to an improper server or an improper virtual machine of a plurality of servers or virtual machines.

In the present disclosure, the configurations and possible actions may be granted a privilege level (e.g., rights), as may the details of those actions, such as the nature and source of the traffic selected, and the identity and location of the physical servers, among other details. Once these rights have been granted, more control over managing the switch may be established and other features can be added. Checking permissions on any action and traffic can establish a chain of trust between a management tool (e.g., for a virtual machine) and the switch. The management tool may be given the lowest possible set of permissions that still allows it to configure the portions of the switch to adequately manage the data traffic. This configuration can be performed using virtual machine and/or switch admin permissions. However, rights to the traffic stream created can follow the virtual machine guest operating system.

The management tool can preserve resources and set up the traffic stream on the switch to which it is connected as part of bringing up a guest operating system. When the workload is migrated, the resources on the switch can be released, and new resources (e.g., defined by the traffic stream) can be allocated. When a guest operating system is brought down, network resources can be released.

The systems, devices, and methods for traffic management described in the present disclosure can provide sophisticated features and advanced routing in virtualized, unified, and cloud computing environments. Disparate groups of network administrators and network/virtual machine management systems can be enabled to direct traffic where needed, and traffic redirection can be controlled by an authorization table administered by security officers, senior network administrators, and/or other authorized entities.

Figure 5:
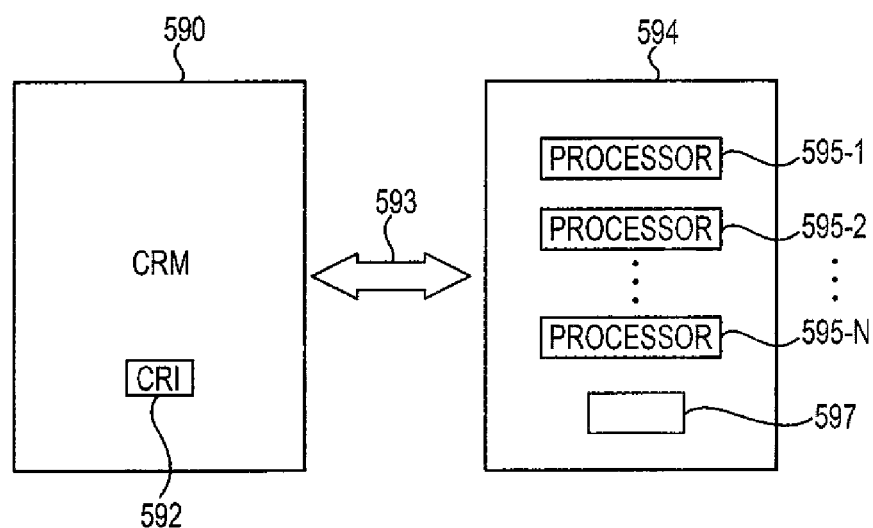
FIG. 5 is a block diagram illustrating an example of a computing device readable medium in communication with processing resources according to the present disclosure.

FIG. 5 is a block diagram illustrating an example of a computing device readable medium (CRM) in communication with processing resources according to the present disclosure. For example, the CRM 590 can be in communication via a communication path 593 with (e.g., operatively coupled to) a computing device 594 having a number of processing resources 595-1, 595-2, . . . , 595-N (e.g., one or more processors). The CRM 590 can include computing device readable instructions (CRI) 592 to cause the computing device 594 to, for example, receive a number of policies for data traffic redirection in a data network and authorize a subset of the number of policies based upon matching a plurality of authorization rules saved in a management tool of the data network. The computing device 594 can also include memory resources 597, and the processing resources 595-1, 595-2, . . . , 595-N can be coupled to these memory resources 597 in addition to those of the CRM 590.

The CRM 590 can be in communication with the computing device 594 having processing resources of more or fewer than 595-1, 595-2, . . . , 595-N. The computing device 594 can be in communication with and/or receive from a tangible non-transitory CRM 590 storing a set of stored CRI 592 executable by one or more of the processing resources 595-1, 595-2, . . . , 595-N for data traffic management. The stored CRI 592 can be an installed program or an installation pack. If an installation pack, the memory, for example, can be a memory managed by a server such that the installation pack can be downloaded.

Processing resources 595-1, 595-2, . . . , 595-N can execute the CRI 592 for data traffic management. A non-transitory CRM (e.g., CRM 590), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), etc., as well as other types of CRM.

The non-transitory CRM 590 can be integral, or communicatively coupled, to a computing device, in either in a wired or wireless manner. For example, the non-transitory CRM 590 can be an internal memory, a portable memory, a portable disk, or a memory located internal to another computing resource (e.g., enabling CRI 592 to be downloaded over the Internet).

The CRM 590 can be in communication with the processing resources 595-1, 595-2, . . . , 595-N via the communication path 593. The communication path 593 can be local or remote to a machine associated with the processing resources 595-1, 595-2, . . . , 595-N. Examples of a local communication path 593 can include an electronic bus internal to a machine such as a computing device where the CRM 590 is one of volatile, non-volatile, fixed, and/or removable storage medium in communication with the processing resources 595-1, 595-2, . . . , 595-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 593 can be such that the CRM 590 is remote from the processing resources 595-1, 595-2, . . . , 595-N such as in the example of a network connection between the CRM 590 and the processing resources 595-1, 595-2, . . . , 595-N. That is, the communication path 593 can be a network connection. Examples of such a network connection can include a LAN, a WAN, a PAN, and the Internet, among others. In such examples, the CRM 590 may be associated with a first computing device and the processing resources 595-1, 595-2, . . . , 595-N may be associated with a second computing device.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A method for data traffic management, comprising:
using a computing device having a processor to execute non-transitory instructions for;
receiving a plurality of redirection policies that are proposed for reconfiguration of the data traffic in authorized redirection policies in a data network, wherein each of the plurality of proposed redirection policies includes a plurality of redirection rules for reconfiguration of redirection rules in the authorized redirection policies;
authorizing a subset of the plurality of proposed redirection policies to be included in a table of the authorized redirection policies based upon matching the plurality of redirection rules for reconfiguration with a plurality of authorization rules of a plurality of authorization policies saved in an authorization table in the data network;
wherein matching the plurality of redirection rules for reconfiguration and the plurality of authorization rules of the plurality of authorization policies comprises;
matching types of data traffic based on Access Control Lists (ACLs) with fields to match IP addresses and Transmission Control Protocol (TCP) port numbers; and
matching types of destination based on destination ports to direct the data out a specific port of the device and a destination next-hop to direct the device to forward the data to a specific IP next hop; and
adding the authorized subset of the plurality of proposed redirection policies that match the types of data traffic and the types of destination to reconfigure the table of authorized redirection policies.

2. The method of claim 1, wherein the method includes protecting data traffic from being redirected to an improper server or an improper virtual machine of a plurality of servers or virtual machines.

3. The method of claim 1, wherein the method includes receiving the plurality of proposed redirection policies from a virtual machine manager or a virtual management application and determining whether the virtual machine manager or the virtual management application is authorized to redirect particular data traffic.

4. The method of claim 1, wherein receiving the plurality of proposed redirection policies comprises receiving the plurality of proposed redirection policies by a management tool or network device of the data network.

5. The method of claim 1, wherein receiving the plurality of proposed redirection policies for data traffic redirection comprises receiving directions for reconfiguring a number of switches that direct data traffic to a specified server or a specified virtual machine of a plurality of servers or virtual machines.

6. The method of claim 1, wherein authorizing the subset of plurality of proposed redirection policies comprises permitting enablement of the subset based upon matching the plurality of authorization rules and denying enablement of policies that do not match the plurality of authorization rules.

7. The method of claim 1, wherein authorizing the subset of the plurality of proposed redirection policies comprises comparing a plurality of redirection rules of the number of policies to the plurality of authorization rules to perform the matching, wherein the redirection rules and authorization rules are selected from a group that comprises:
- identification of a virtual machine manager or a virtual management application from which a particular policy is received;
- a description of the data traffic to be redirected; and
- a description of a destination of the data traffic to be redirected.

8. A data traffic management device, comprising:
a computing apparatus having a processor;
machine readable instructions stored on a non-transitory machine readable medium executable by the processor to direct;
a data network interface;
a subsystem coupled to the data network interface to receive a plurality of redirection policies that are proposed for reconfiguration of the data traffic in authorized redirection policies, wherein each of the plurality of proposed redirection policies includes a plurality of redirection rules for reconfiguration of redirection rules in the authorized redirection policies; and
a processing resource of a management tool coupled to the subsystem and the data network interface to authorize a subset of the plurality of proposed redirection policies to be included in a table of the authorized redirection policies based upon a match of the plurality of redirection rules for reconfiguration with a plurality of authorization rules of at least one of a plurality of authorization policies saved in an authorization table in the management tool,
wherein to match the plurality of proposed redirection rules for reconfiguration and the plurality of authorization rules of the plurality of authorization policies comprises to;
match types of data traffic based on Access Control Lists (ACLs) with fields to match IP addresses and Transmission Control Protocol (TCP) port numbers; and
match types of destination based on destination ports to direct the data out a specific port of the device and a destination next-hop to direct the device to forward the data to a specific IP next hop;
wherein to authorize comprises to permit enablement of the subset by addition of the authorized subset of the plurality of proposed redirection policies to reconfigure the table of authorized redirection policies based upon the match of the plurality of authorization rules, and
wherein to deny enablement comprises to not add proposed redirection policies to the table of authorized redirection policies that do not match the plurality of authorization rules.

9. The device of claim 8, wherein the processing resource authorizes the subset by comparison of a plurality of redirection rules of each of the plurality of received proposed redirection policies to the plurality of authorization rules to determine whether the plurality of redirection rules matches the plurality of authorization rules.

10. The device of claim 9, wherein the device stores a number of traffic redirection tables that each save a number of redirection policies each having a plurality of redirection rules selected from a group that comprises:
- identification of a virtual machine manager or a virtual management application from which a particular policy is received;
- a description of the data traffic to be redirected; and
- a description of a destination of the data traffic to be redirected.

11. The device of claim 10, wherein the number of traffic redirection tables each comprise received proposed redirection policies determined to match a first plurality of saved authorization rules and/or do not include received proposed redirection policies determined not to match a second plurality of saved authorization rules.

12. The device of claim 9, wherein the management tool stores a number of redirection authorization tables that each save a plurality of authorization rules, for data traffic redirection policies, selected from a group that comprises:
- identification of a virtual machine manager or a virtual management application from which a number of particular policy redirection rules are permitted;
- a description of permitted data traffic to be redirected, wherein the permitted data traffic comprises a designation of a permitted type of data traffic and a permitted destination of the data traffic; and
- a description of a number of the permitted destinations for redirection of the data traffic, wherein the permitted destinations comprise a destination port to direct the data out a specific port of the device and a destination next-hop to direct the device to forward the data to a specific IP next hop; and
- an authorization component that, based on the match of the redirection rules of a proposed redirection policy with the plurality of authorization rules, outputs a decision to permit or deny addition of each received proposed redirection policy to the table of authorized redirection policies.

13. A data traffic management system, comprising:
a communication interconnect;
a network device to receive a plurality of redirection policies that are proposed for reconfiguration of the data traffic in authorized redirection policies coupled to the communication interconnect, wherein each of the plurality of proposed redirection policies includes a plurality of redirection rules for reconfiguration of redirection rules in the authorized redirection policies; and
a management tool to authorize a subset of the plurality of proposed redirection policies for data traffic by a number of switches conditioned on a match of the plurality of redirection rules with a plurality of saved authorization rules of a plurality of authorization policies;
wherein to match the plurality of proposed redirection rules for reconfiguration and the plurality of authorization rules of the plurality of authorization policies comprises to
match types of data traffic based on Access Control Lists (ACLs) with fields to match IP addresses and Transmission Control Protocol (TCP) port numbers; and
match types of destination based on destination ports to direct the data out a specific port of the device and a destination next-hop to direct the device to forward the data to a specific IP next hop; and wherein, based on a match of the types of data traffic and the types of destination, the management tool adds the authorized subset of the plurality of proposed redirection policies to reconfigure a table of the authorized redirection policies.

14. The system of claim 13, wherein the number of switches direct the data traffic to a particular application of a specified server or a specified virtual machine of a plurality of servers or virtual machines.

15. The system of claim 14, wherein the management tool authorizes the number of switches to redirect the data traffic to the particular application of the specified server or the specified virtual machine conditioned on a match of the plurality of redirection rules for a particular proposed redirection policy for the data traffic with the plurality of saved authorization rules.

* * * * *